United States Patent
Emam

(10) Patent No.: US 9,046,285 B2
(45) Date of Patent: Jun. 2, 2015

(54) SOLAR AIR CONDITIONER

(71) Applicant: Hassan S. Emam, Ambridge, PA (US)

(72) Inventor: Hassan S. Emam, Ambridge, PA (US)

(*) Notice: Subject to any disclaimer, the term of this patent is extended or adjusted under 35 U.S.C. 154(b) by 419 days.

(21) Appl. No.: 13/648,316

(22) Filed: Oct. 10, 2012

(65) Prior Publication Data

US 2014/0096556 A1 Apr. 10, 2014

(51) Int. Cl.
| | | |
|---|---|---|
| F28D 5/00 | (2006.01) | |
| F24F 5/00 | (2006.01) | |
| F25B 27/00 | (2006.01) | |
| F25B 19/00 | (2006.01) | |
| F25D 17/00 | (2006.01) | |

(52) U.S. Cl.
CPC ............... *F25B 19/00* (2013.01); *F24F 5/0035* (2013.01); *F24F 5/0046* (2013.01); *F24F 2005/0064* (2013.01); *F25D 17/00* (2013.01); *F28D 5/00* (2013.01); *Y02B 30/545* (2013.01)

(58) Field of Classification Search
CPC ............ F24F 5/0035; F24F 2001/0085; F24F 2001/0088; F25B 27/002; F25B 2339/041; F25B 2339/047; F28D 5/00
USPC ............. 62/121, 171, 180, 235.1, 259.4, 310, 62/314, 315
See application file for complete search history.

(56) References Cited

U.S. PATENT DOCUMENTS

| | | | |
|---|---|---|---|
| 4,350,200 A | 9/1982 | McElwain | |
| 5,715,698 A * | 2/1998 | Calton | ............................. 62/309 |
| 6,574,979 B2 | 6/2003 | Faqih | |
| 7,927,406 B2 | 4/2011 | Takeuchi | |
| 2006/0000227 A1* | 1/2006 | Hyland et al. | ................... 62/236 |
| 2008/0041083 A1* | 2/2008 | Al-Garni et al. | ............. 62/235.1 |

FOREIGN PATENT DOCUMENTS

| | | |
|---|---|---|
| JP | 8-219486 | 8/1996 |
| JP | 2007-271121 | 10/2007 |
| JP | 2010-175120 | 8/2010 |

\* cited by examiner

*Primary Examiner* — Marc Norman
(74) *Attorney, Agent, or Firm* — Oblon, McClelland, Maier & Neustadt, L.L.P.

(57) ABSTRACT

A solar air conditioner provides cooling by way of liquid evaporation. The solar air conditioner includes a liquid evaporation unit, a heat exchange unit, and a solar power generation unit. The liquid evaporation unit includes an outer housing and an inner housing. The outer housing includes a fan affixed to the top and an plurality of openings on the side wall. The inner housing inside the outer housing has a plurality of porous holes through which the liquid therein penetrates to the outer surface. The penetrated liquid comes in contact with the warm air drawn by the fan and evaporation subsequently occurs cooling the liquid inside the inner housing. The cooled liquid is then provided to the heat exchange unit for cooling a target area. The pumps and fans are powered by the solar power generation unit.

11 Claims, 4 Drawing Sheets

SOLAR AIR CONDITIONER

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

1. Field of the Disclosure

The current invention relates to an air conditioner providing cooling by way of liquid evaporation. The air conditioner is optionally powered by solar energy.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nowadays, air conditioners have become one of the essential items in residential and office buildings. Air conditioners provide a pleasant living or working environment by dehumidifying and lowering the temperature in the local area. Air conditioners commonly employ an electric motor to drive a compressor that compresses and circulates a refrigerant in the air conditioning system. However, it is widely known that the compressor consumes more energy than other electric appliances.

As industrialization continues in underdeveloped part of the globe, demand for air conditioners is expected to grow worldwide in the future. Experts are concerned on energy shortages due to this increasing trend in energy consumption. In particular, the prediction that fossil fuels could be completely depleted within next couple of decades has triggered an imminent need for development of alternative energy sources along with more energy efficient appliances including air conditioners.

Moreover, there have been environmental concerns raised on chemical compounds such as R-12 (also known as Freon) which was widely used as refrigerants in air conditioners and refrigerators, and this issue caught worldwide attention because R-12 is deemed hazardous to the environment by posing a threat to the ozone layer. Consequently, more environmentally friendly air conditioners are highly desired.

An example of environmentally friendly cooling is evaporative cooling. The principle of evaporative cooling has been known for centuries. An example of evaporative cooling is cooling by human perspiration. Humans have pores in the skin from which liquid water internal to the skin is escaping and converting to water vapor in the air. As this happens, there is a cooling effect on our skin surface. For another example, a water soaked cloth placed over an object keeps the object cool by evaporation of water from the object. When evaporation occurs from a surface, there is an energy associated with the phase change known as the latent heat of vaporization. In a given system, as a gas species flows over the wet surface, evaporation and condensation continuously occur to maintain steady-state conditions. In order to sustain evaporation, there must be a draw of internal energy in the liquid, which would result in a temperature reduction. This cooling effect is known as evaporative cooling and is most effective in dry climates due to the lack of moisture content (relative humidity) in the air.

A device called zeer pot is another example making use of the effect of evaporative cooling. The zeer pot is typically made of clay and consists of an inner pot, an outer pot, wet sand between the inner pot and the outer pot, and a wet cloth on top. The zeer pot cools as the water evaporates allowing food stored in the inner pot to be kept fresh for much longer in a hot and dry climate, and is normally placed in a dry and ventilated space for the water to evaporate effectively towards the outside.

SUMMARY OF THE INVENTION

As described in the description that follows, the solar air conditioner provides a device that solves the problems previously discussed. The solar air conditioner provides cooling in an energy efficient and environmentally friendly way.

In selected embodiments, the solar air conditioner provides cooling by way of liquid evaporation. The solar air conditioner includes a liquid evaporation unit, a heat exchange unit, and a solar power generation unit. The liquid evaporation unit includes an outer housing and an inner housing. A fan is affixed to the top of the outer housing to draw warm air via a plurality of openings on the bottom portion of the side wall of the outer housing. The inner housing inside the outer housing has a plurality of porous holes through which the liquid therein penetrates to the outer surface. The penetrated liquid comes in contact with the warm air drawn by the fan and evaporation subsequently occurs cooling the liquid inside the inner housing. The cooled liquid is then transferred to the heat exchange unit where heat exchange occurs between the cooled liquid and a target area that needs to be cooled. The heat exchange unit includes a heat exchange fan that blows air over a copper coil containing the transferred cooled liquid and cooled air is subsequently provided to the target area.

Pumps and fans included in the solar air conditioner are optionally powered by the solar power generation unit. The solar power generation unit includes a solar panel, a battery, and a solar charge controller. There is also provided an electronic control unit that controls operation of the solar air conditioner. For example, the electronic control unit determines when the evaporation of the liquid gets started or stopped or when additional liquid gets supplied from a reservoir to the inner housing.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by the present specification. The scope of the advancements embraced by the present specification and drawings is defined by the words of the accompanying claims.

DETAILED DESCRIPTION OF THE EMBODIMENTS

Figure 1:
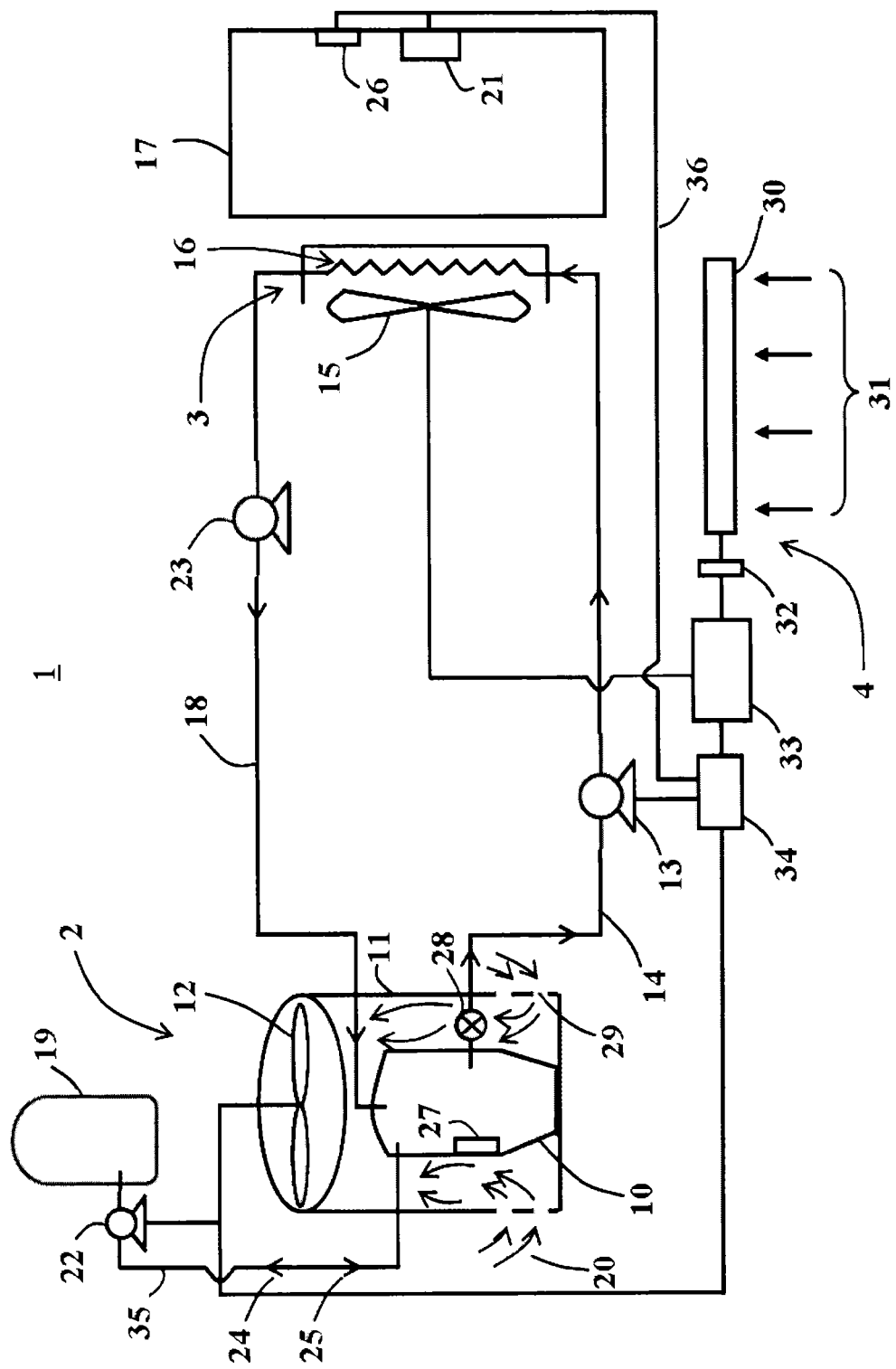
FIG. 1 illustrates an air conditioning system according to an exemplary embodiment of the present invention.

Referring now to the drawings, wherein like reference numerals designate identical or corresponding parts throughout the several views.

FIG. 1 illustrates the structure of a solar air conditioner 1 according to an exemplary embodiment of the present invention. The solar air conditioner 1 includes a liquid evaporation unit 2, a heat exchange unit 3, and a solar power generation unit 4. The liquid evaporation unit 2 cools down the liquid by way of evaporative cooling and supplies the cooled liquid to the heat exchange unit 3 so that heat exchange occurs between the cooled liquid and a target area 17 that needs to be cooled.

The liquid evaporation unit 2 includes an outer housing 11 and an inner housing 10. The top portion of the outer housing 11 is open to air and a housing fan 12 is affixed to the top of the outer housing 11 to draw warm air 20 from outside of the outer housing 11 into the inner bottom space of the outer housing 11. As shown in FIG. 1, the warm air 20 is drawn into the inner bottom space of the outer housing 11 via a plurality of openings or holes 29 on the bottom portion of the side wall of the outer housing 11 and then up to the inner top space of the outer housing 11. The inner housing 10 is disposed inside the outer housing 11 and contains the liquid to be used in the process of evaporative cooling.

The liquid evaporation unit 2 of the present invention implements evaporative cooling to cool down the liquid inside the inner housing 10. The inner housing 10 has a plurality of porous holes that allow the liquid to gradually penetrate from the inner surface to the outer surface of the inner housing 10. According to an exemplary embodiment of the present invention, the inner housing 10 may be a single layered container or a multi layered container.

Figure 2:
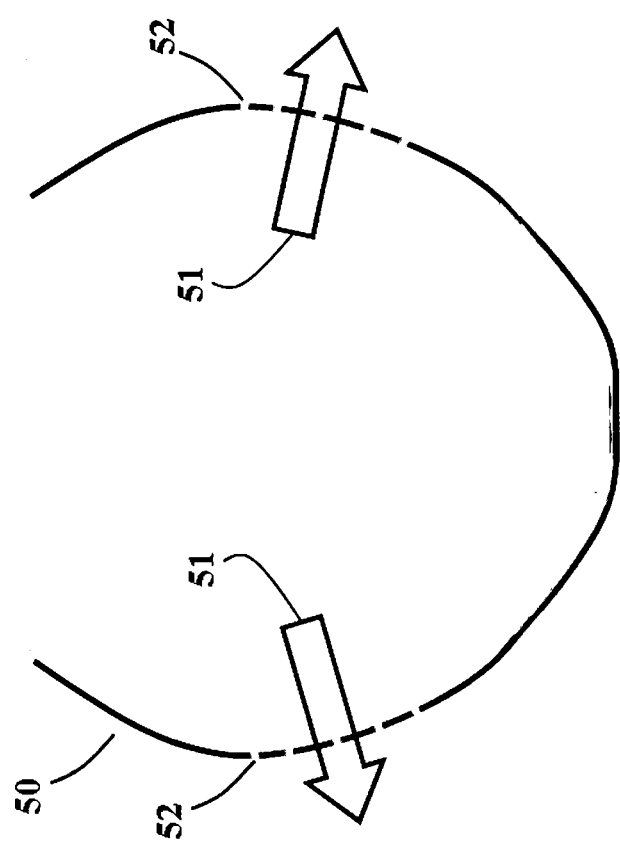
FIG. 2 is a cross-sectional view of a single layered container according to an exemplary embodiment of the present invention.

FIG. 2 is a cross-sectional view of a single layered container 50 according to an exemplary embodiment of the present invention. The single layered container 50 has a plurality of porous holes 52 that allow the liquid to gradually penetrate from the inner surface to the outer surface of the single layered container 50. Arrows 51 indicate the direction in which the liquid gradually penetrates.

Figure 3:
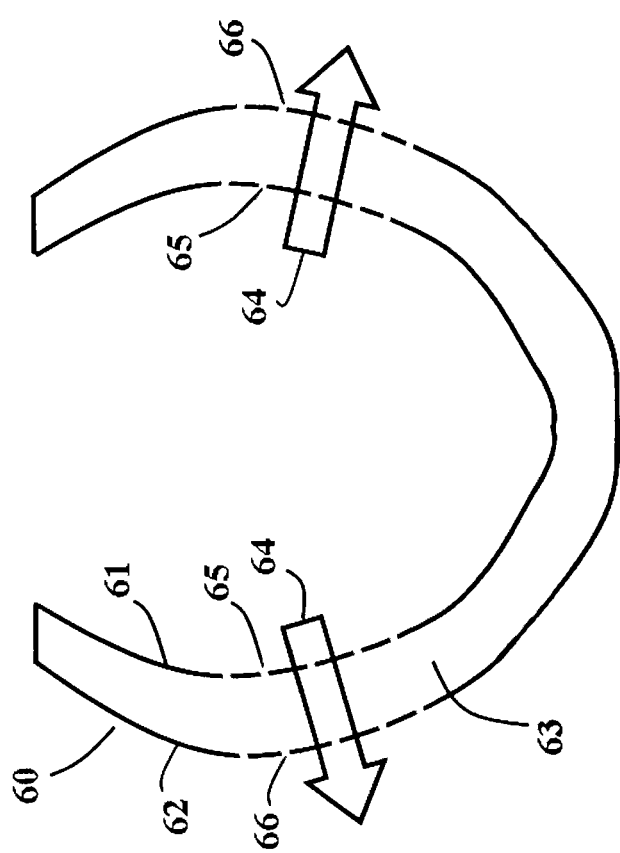
FIG. 3 is a cross-sectional view of a dual layered container according to an exemplary embodiment of the present invention.

FIG. 3 is a cross-sectional view of a dual layered container 60 according to an exemplary embodiment of the present invention. The dual layered container 60 includes an inner container 61 and an outer container 62, both of which have a plurality of porous holes 65, 66 that allow the liquid to gradually penetrate from the inside to the outside. Arrows 64 indicate the direction in which the liquid gradually penetrates. The dual layered container 60 may include medium material 63 between the inner container 61 and the outer container 62. An example of such a dual container having medium material 63 is a zeer pot that may be made of clay and consist of an inner pot, an outer pot, and wet sand between the inner pot and the outer pot. However, the multi layered container according to an exemplary embodiment of the present invention is not limited to the zeer pot and may be any multi layered container, with or without medium material 63, including a plurality of porous holes that allow the liquid contained inside the multi layered container to penetrate to the outside.

Referring back to FIGS. 1 and 2, the warm air 20 drawn in by the housing fan 12 comes in contact with the liquid that has penetrated from the inner housing 10 via the porous holes 52 and evaporation of the liquid occurs outside the inner housing 10. In the process of evaporation, the temperature of the inner housing 10 is lowered, which in turn cools the liquid inside the inner housing 10. There is provided a thermometer 27 to measure the temperature of the liquid inside the inner housing 10. In selected embodiments, once the temperature of the liquid goes below a preset temperature, an electric control unit 34 (hereinafter "ECU") recognizes the temperature of the liquid is below the preset temperature and controls a first pump 13 such that the cooled liquid inside the inner housing 10 is transferred to the heat exchange unit 3 via a first pipe line 14 by opening a valve 28. The cooled liquid is pumped out of the inner housing 10 by the first pump 13 connected to the first pipe line 14 and transferred to the heat exchange unit 3.

The heat exchange unit 3 is a device where heat exchange occurs between the cooled liquid and a target area 17. The target area 17 is any space that is external to the solar air conditioner 1 and needs to be cooled, such as a room, for example. As illustrated in FIG. 1, the heat exchange unit 3 may include a heat exchange fan 15 and a copper coil 16 according to an exemplary embodiment of the present invention. The heat exchange fan 15 blows air over the copper coil 16 in which the transferred cooled liquid flows and cooled air is supplied to the target area 17. The inlet of the copper coil 16 is connected to the first pipe line 14 and the outlet of the copper coil 16 is connected to a second pipe line 18. The liquid coming out of the copper coil 16 is transferred back to the inner housing 10 by a second pump 23 connected to the second pipe line 18 under the control of the ECU 34.

In selected embodiments, the liquid used for evaporative cooling is water or alcohol. However, other types of liquid may be used as well. The liquid is stored in a reservoir 19 that is connected to the inner housing 10 via a third pipe line 35. A third pump 22 connected to the third pipe line 35 transfers the liquid from the reservoir 19 to the inner housing 10 or vice versa in accordance with the control of the ECU 34, which is based on an inputted command from an occupier of the target area 17.

A thermostat 21 is provided to receive a command from an occupier of the target area 17. The command may include a temperature threshold for the target area 17, i.e. the highest room temperature the occupier wishes to maintain for the target area 17. The received command is transmitted to the ECU 34 via a transmission line 36. The transmission line 36 may be a land line or other types of communication line such as a wireless connection or a local area network (LAN). Once the temperature threshold is received, the ECU 34 compares the temperature threshold with the ambient temperature measured by a room thermometer 26 and determines if cooling is needed to achieve the temperature threshold.

The solar air conditioner 1 is optionally powered by the solar power generation unit 4 according to an exemplary embodiment of the present invention. As shown in FIG. 1, the solar power generation unit 4 further includes a solar panel 30, a solar charge controller 32, and a battery 33. The solar panel 30 generates electricity using externally received light energy 31 and the battery 33 stores the electricity generated by the solar panel 30. The solar charge controller 32 monitors and controls power going into and coming out of the battery 33 to ensure that the battery 33 is not overcharged. The electricity from either the battery 33 or the solar panel 30 is supplied to operate the aforementioned pumps and fans. The ECU 34 determines which unit between the battery 33 and the solar panel 30 supplies the electricity to the pumps and fans in consideration of various pre-programmed factors. The pre-programmed factors may include the currently charged state of the battery 33, the current temperature of the liquid, and the difference between the ambient temperature and the temperature threshold for the target area 17. Accordingly, the solar air conditioner 1 of the present invention requires no external supply of electrical power as long as sufficient amount of electricity can be provided from either the battery 33 and the solar panel 30. However, in case of insufficient charged state of the battery 33 or bad weather, the electricity from a local energy supplier may be used either alone or along with the solar power generation unit 4 to operate the pumps and fans.

Figure 4:
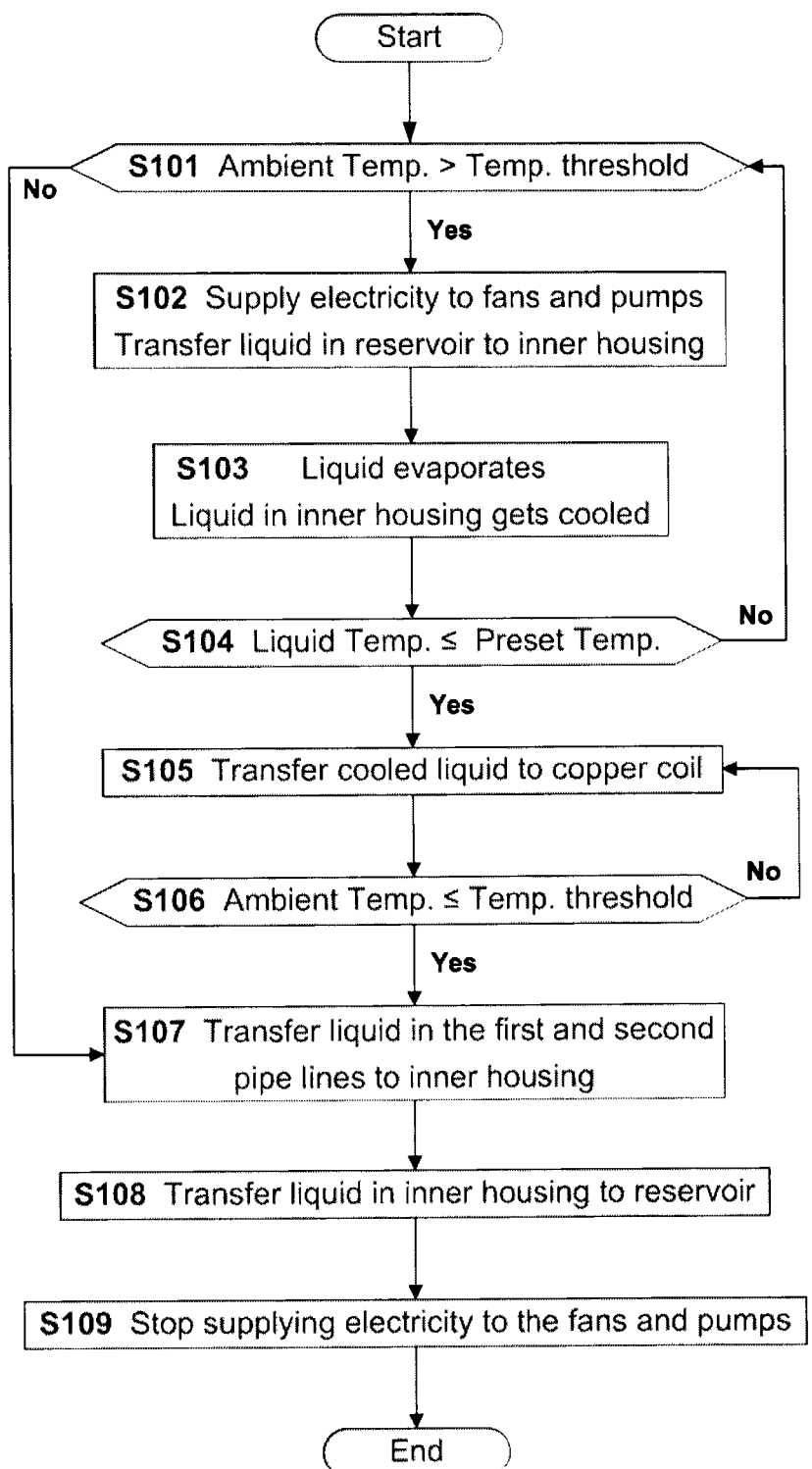
FIG. 4 is a flow chart showing how the solar air conditioner operates according to an exemplary embodiment of the present invention.

FIG. 4 is a flow chart showing how the solar air conditioner 1 operates according to an exemplary embodiment of the present invention. This operation flow of the solar air conditioner 1 controlled by the ECU 34 will be explained in detail with reference to FIG. 4.

First, when the ECU 34 receives the temperature threshold for the target area 17 via the thermostat 21, the ECU 34 compares the temperature threshold with the ambient temperature measured by the room thermometer 26 at S101. When the ambient temperature is equal to or lower than the temperature threshold, the liquid in the first and second pipe lines 14, 18 is transferred to the inner housing 10 at S107. On the other hand, when the ambient temperature is higher than the temperature threshold, the ECU 34 supplies electricity to the pumps and fans and the liquid in the reservoir 19 is transferred to the inner housing 10, i.e. in a direction 25 from the reservoir 19 to the inner housing 10 at S102. With a supply of electricity from the battery 33 or the solar panel 30, the housing fan 12 starts operating and the liquid starts evaporating outside the inner housing 10 thereby subsequently cooling the liquid in the inner housing 10 at S103.

At S104, the ECU 34 compares the liquid temperature in the inner housing 10 with a preset temperature. The preset temperature is a pre-determined temperature set automatically or manually in the ECU 34 so that the cooled liquid equal to or lower than the preset temperature can effectively provide cooling to the target area 17. When the liquid temperature is greater than the preset temperature, the processing returns to S101 and starts over. On the other hand, when the liquid temperature is equal to or lower than the preset temperature, the ECU 34 controls the first pump 13 to transfer the cooled liquid in the inner housing 10 to the heat exchange unit 3 at S105. More specifically, the valve 28 is opened and the first pump 13 pumps the cooled liquid from the inner housing 10 to the copper coil 16 via a first pipe line 14. When the cooled liquid is transferred to the inlet of the copper coil 16, the ECU 34 controls the heat exchange fan 15 to start blowing air over the copper coil 16 such that the cooled air is then supplied to the target area 17 thereby subsequently lowering the ambient temperature in the target area 17. The second pump 18 pumps the liquid coming out of the outlet of the copper coil 16 back to the inner housing 10 via the second pipe line 18. The ECU 34 constantly monitors the level of the liquid in the inner housing 10 and replenishes the liquid from the reservoir 19 if necessary to maintain cooling or constant levels of liquid required for evaporation as described herein.

Thereafter, at S106 the ECU 34 checks if the ambient temperature in the target area 17 becomes equal to or lower than the temperature threshold. When the ambient temperature is higher than the temperature threshold, the processing continues to transfer the cooled liquid to the copper coil 16. On the other hand, when the ambient temperature is equal to or lower than the temperature threshold, the ECU 34 determines that cooling operations need to be stopped. The ECU 34 therefore commands the housing fan 12 to stop operating, closes the valve 28, and transfers the liquid remaining in the first and second pipe lines 14, 18 to the inner housing 10 at S107. The ECU 34 subsequently transfers the liquid in the inner housing 10 to the reservoir 19, i.e. in a direction 24 from the inner housing 10 to the reservoir 19 as shown in FIG. 1 so that evaporation in the liquid evaporation unit 2 is prevented from occurring (at S108). Once the transfer of the liquid back to the reservoir 19 is complete, all of the fans and pumps are stopped from operating (at S109) and the operation flow ends.

Since the solar air conditioner 1 of the present invention does not require a compressor or other high energy consuming devices, energy consumption rate of the solar air conditioner is low. The solar air conditioner can be powered by solar energy and does not produce and emit any toxic gas such as Freon to the atmosphere, and is, therefore, an environmentally friendly apparatus. Another advantage of the solar air conditioner 1 is low maintenance cost and suitability in many places due to low energy consumption.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. An air conditioning system, comprising:
   an outer housing having a top portion open to air and a side wall, a bottom portion of the side wall having a plurality of openings;
   a housing fan affixed to a top of the outer housing such that the housing fan draws warm air from outside of the outer housing via the plurality of the openings into an inner bottom portion of the outer housing and up to an inner top portion of the outer housing;
   an inner housing inside the outer housing containing a liquid and having a plurality of porous holes;
   a heat exchange fan;
   a copper coil in front of the heat exchange fan;
   a first pipe line connecting the inner housing to an inlet of the copper coil;
   a second pipe line connecting an outlet of the copper coil to the inner housing;
   a first pump connected to the first pipe line to transfer the liquid from the inner housing to an inlet of the copper coil via the first pipe line; and
   a second pump connected to the second pipe line to transfer the liquid from an outlet of the copper coil to the inner housing via the second pipe line,
   wherein the liquid inside the inner housing gradually penetrates to an outer surface of the inner housing through the plurality of the porous holes,
   the penetrated liquid comes in contact with the warm air drawn by the housing fan and evaporates such that a temperature of the inner housing and liquid is lowered,
   the first pump transfers the cooled liquid inside the inner housing to the copper coil via the first pipe line,
   the heat exchange fan blows air over the copper coil to supply cooled air to a target area external to the air conditioning system, and the second pump transfers the liquid coming out of the copper coil back to the inner housing via the second pipe line.

2. The air conditioning system of claim 1, further comprising:
   a solar panel to generate electricity via light energy from the sun;
   a battery to store the electricity generated by the solar panel; and
   a solar charge controller to control a charged state of the battery, wherein the electricity from at least one of the solar panel and the battery operates the fans and pumps.

3. The air conditioning system of claim 2, further comprising:
   a reservoir to store and supply the liquid to the inner housing; and
   a third pump to transfer the liquid between the reservoir and the inner housing, wherein the electricity from at least one of the solar panel and the battery operates the third pump.

4. The air conditioning system of claim 3, further comprising:
   a thermostat to receive a command including a temperature threshold for the target area;
   a second thermometer inside the inner housing to measure a temperature of the liquid in the inner housing; and
   an electronic control unit to received the command and control a supply of the electricity for the fans and pumps in accordance with the command.

5. The air conditioning system of claim 4, wherein when an ambient temperature of the target area measured by a first thermometer and received by the electronic control unit is higher than the temperature threshold, the electronic control unit controls the supply of the electricity to power the fans and pumps, and the third pump transfers the liquid in the reservoir to the inner housing.

6. The air conditioning system of claim 5, wherein when the temperature of the liquid inside the inner housing measured by the second thermometer is lower than a preset temperature of the liquid, the electronic control unit controls a valve to be opened and the first pump to transfer the liquid inside the inner housing to the copper coil and the heat exchange fan blows air over the copper coil and supplies cooled air to the target area.

7. The air conditioning system of claim 5, wherein when the ambient temperature received by the electronic control unit is equal to or lower than the temperature threshold, the electronic control unit controls the first and second pumps to transfer the liquid remaining in the first and second pipe lines to the inner housing, and controls the third pump to transfer liquid in the inner housing to the reservoir to prevent evaporation of the liquid.

8. The air conditioning system of claim 1, wherein the first and second pipe lines are copper pipe lines.

9. The air conditioning system of claim 1, wherein the liquid is at least one of water and alcohol.

10. The air conditioning system of claim 1, wherein the inner housing is a zeer pot.

11. The air conditioning system of claim 10, wherein the zeer pot includes an inner pot, an outer pot surrounding the inner pot, and sand therebetween,
   the inner pot has a plurality of porous holes,
   the outer pot has a plurality of porous holes,
   the inner pot contains the liquid, and
   the liquid gradually penetrates from the inner pot to the sand through the plurality of the porous holes of the inner pot and further penetrates from the sand to an outer surface of the outer pot through the porous holes of the outer pot.

* * * * *